United States Patent [19]

Keck et al.

[11] Patent Number: 4,522,863

[45] Date of Patent: Jun. 11, 1985

[54] SOFT NONWOVEN LAMINATE BONDED BY ADHESIVE ON REINFORCING SCRIM

[75] Inventors: Daniel H. Keck, Woodstock; Ralph V. Braun, Roswell; Mark B. Majors, Duluth, all of Ga.

[73] Assignee: Kimberly-Clark Corporation, Neenah, Wis.

[21] Appl. No.: 105,273

[22] Filed: Jun. 21, 1984

[51] Int. Cl.³ .......................... B32B 5/26; B32B 7/14
[52] U.S. Cl. ................................. 428/196; 156/272.2; 156/285; 156/308.4; 428/198; 428/236; 428/239; 428/296; 428/903
[58] Field of Search .............. 428/196, 198, 236, 239, 428/296, 903; 156/272.2, 285, 308.4

[56] References Cited

U.S. PATENT DOCUMENTS 4,355,066 10/1982 Newman .......................... 428/903

Primary Examiner—Marion E. McCamish
Attorney, Agent, or Firm—William D. Herrick; R. Jonathan Peters; James P. O'Shaunessey

[57] ABSTRACT

Improved nonwoven fabric laminate including one or more tissue plies as an outside layer, a middle layer as a primary strength bearing member comprising a scrim carrying a heat reactable plastisol adhesive and, on the side of the scrim opposite from the tissue, a layer of meltblown microfibers. The resulting combination, when bonded by means of the adhesive on the scrim, provides windows of relatively unbonded fibers reinforced with bonded scrim threads. Preferably, the microfiber web is substantially unbonded prior to combining with the other components so that a bulky and soft material results in the window areas between the scrim threads. Also preferably the tissue is low porosity formed from essentially unrefined or only slightly refined pulp. Such laminates find ideal applications as substitutes for cloth, particularly in disposable garments and other fabrics for medical use. For these purposes and others, various treatments may be applied to achieve properties such as water repellency, fire retardency, alcohol repellency, and the combination may be physically compacted for even further softness. The combination exhibits improved water repellency, tactile and strength properties.

12 Claims, 2 Drawing Figures

SOFT NONWOVEN LAMINATE BONDED BY ADHESIVE ON REINFORCING SCRIM

BACKGROUND OF THE INVENTION

1. Field of the Invention

The present invention relates to nonwoven fabrics and particularly those nonwoven fabrics intended for limited use or disposable applications. Examples include medical fabrics for disposable drapes, gowns, table covers and the like intended for hospital, clinic, or other health care uses. Examples of other laboratory, industrial, or even consumer uses where clothlike attributes are desired will be apparent to those skilled in the art. With appropriate treatments nonwoven webs intended for such end uses may be imparted desirable properties such as water repellency, alcohol repellency, fire retardency, and the like. More particularly, the present invention is directed to such nonwoven webs made by combining multiple web components into an integrated laminate demonstrating the desired properties.

2. Description of the Prior Art

Nonwoven webs, including those of laminate constructions, are, of course, well-known. Early constructions involved treatment of paper to improve its wet strength properties. Later developments related to reinforcement of paper, including tissue, by means of scrims of machine direction and cross direction filaments and other fibrous webs. An example of such a scrim laminate with creped cellulose wadding is described in U.S. Pat. No. 3,837,996 to Braun and Knauer dated Sept. 24, 1974. That patent also describes treatments to achieve desired properties such as water repellency. Other laminates of tissue and nonwoven webs are described in U.S. Pat. No. 3,900,632 to Robinson dated Aug. 19, 1975, U.S. Pat. No. 3,870,592 to Brock and Hudson dated Mar. 11, 1975, and U.S. Pat. No. 3,679,515 to Capell and Wilson dated July 25, 1972, for example. Meltblown microfiber web laminates as nonwovens useful for medical applications are known and described, for example, in U.S. Pat. No. 4,041,203 to Brock and Meitner dated Aug. 9, 1977 and in U.S. Pat. No. 4,196,245 to Kitson, Gilbert and Israel dated Apr. 1, 1980. Various softening treatments for nonwoven tissue web laminates are described as improving softness and the like in U.S. Pat. No. 4,113,911 to LaFitte and Camden dated Sept. 12, 1978, for example. In spite of these and other attempts to produce at high speed and low cost a nonwoven fabric having clothlike attributes, particularly as to feel, noise, drape, and strength, there remains desired further improvement towards that objective. Existing materials tend to be paper-like, rattle, and lack required strength properties.

SUMMARY OF THE INVENTION

The present invention is directed to an improved nonwoven web laminate achieving to a higher degree these desirable properties and attributes while permitting low cost manufacture consistent with disposable and limited use applications. In accordance with the invention, the laminate comprises a primary strength bearing member that is a scrim composed of crosslaid threads having applied thereto a heat reactable plastisol adhesive. On one side of the scrim there is applied a tissue layer which may include one or more tissue plies, with the tissue layer having a Frazier porosity of less than about 25 CFM and formed preferably from underrefined pulp. On the other side of the scrim there is applied a layer of microfibers having an average diameter of less than about 10 microns. The combination is bonded by means of the scrim adhesive without excessive calendering and, therefore, includes windowlike areas between the scrim threads that are substantially unbonded. Thus, a lofty, soft, clothlike feel and texture are provided while permitting the scrim to impart high strength to the laminate. In a preferred embodiment the microfiber layer is meltblown and substantially unbonded prior to combination in the laminate so that its high loft properties may be retained in the window areas. The nonwoven laminate of the present invention may be treated by saturation, coating or other application step to produce desired properties such as water or alcohol repellency, fire retardency or the like. In a further embodiment glycerine is included in the treatment composition for improved tactile properties. In a further preferred embodiment the laminate receives a post treatment to enhance the softness such as by button breaking, microcreping, or compaction between a rubber belt and an anvil surface. Nonwoven webs of the invention display excellent water repellency, good barrier properties, and unexpectedly high dry bacteria filtration efficiencies, all useful for applications as medical fabrics, for example.

DESCRIPTION OF THE PREFERRED EMBODIMENTS

Figure 1:
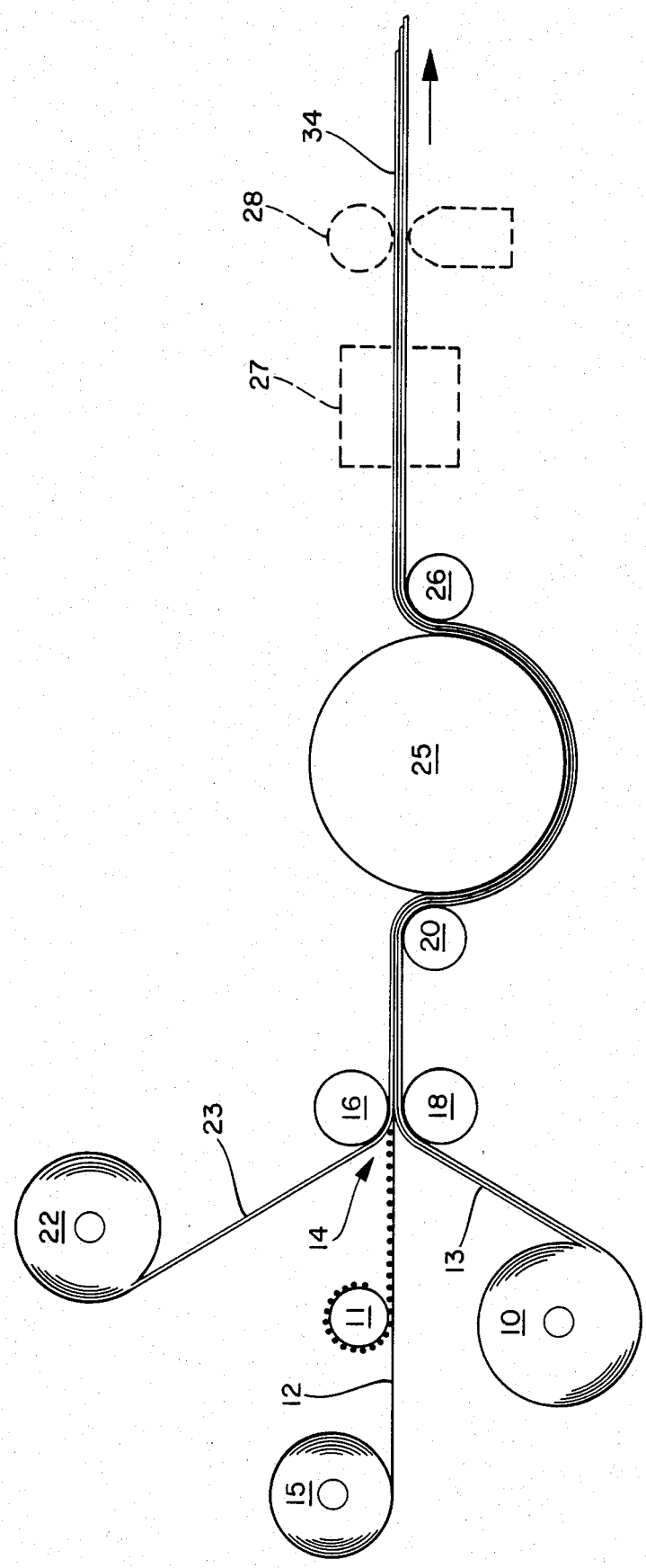
FIG. 1 illustrates in schematic form a method for manufacturing the improved nonwoven webs of the present invention.

While the invention will be described in connection with preferred embodiments, it will be understood that it is not intended to limit the invention to those embodiments. On the contrary, it is intended to cover all alternatives, modifications and equivalents as may be included within the spirit and scope of the invention as defined by the appended claims.

In description of the present invention, reference will be made to test results. Water and alcohol repellency determinations were made as follows: the Mason Jar tests were carried out in accordance with INDA Standard Test Method IST #80.7-70 using both saline and 6% isopropanol solutions. Impact determinations were made using AATCC Test Method 42-1977. Porosity measurements are standard Frazier determinations in cubic feet per minute. Bacteria filtration efficiencies were determined in accordance with the "Nichols" procedure as described in MIL STD 39654 or MIL M-36431B.

The present invention results from the combination of a centrally disposed reinforcing scrim web with a low porosity tissue layer on one side and a layer of microfibers on the other side of the scrim web. For improved feel and appearance, the tissue layer preferably includes multiple plies of low porosity tissue, each having a basis weight in the range of from about 15 to 18.5 grams/square meter (gsm) preferably 16.3 to 17.0 gsm for a total basis weight of tissue of about 30 to 37 gsm. It is also preferred that the tissue be formed from fibers that are underrefined; as used herein that term means that the fibers have received little or no refining.

To achieve the desired low porosity, the tissue may be formed in accordance with disclosures in U.S. Pat. No. 3,224,928 to Lee and Lamb dated Dec. 21, 1965, U.S. Pat. No. 3,360,428 to Loynd dated Dec. 26, 1967, U.S. Pat. No. 3,373,080 to Appel, Graham, and Sanford dated Mar. 12, 1968, U.S. Pat. No. 3,400,045 to Graham dated Sept. 3, 1968 and U.S. Pat. No. 3,652,390 to Peterson dated Mar. 28, 1972, for example. For further discussion of porosity reference may be made to U.S. Pat. No. 3,837,996 to Braun and Knauer dated Sept. 24, 1974. Therein it is explained that tissue customarily does not have low porosity but such may be achieved by control of forming speeds, selection of fine mesh forming wire or the use of very fine fibers as will be apparent to those skilled in the papermaking art. For further control of porosity, the tissue web may be lightly calendered. As a result of any combination of these measures, the Frazier porosity of the two-ply tissue useful in accordance with the invention will be in the range of from about 12 to about 30 cubic feet per minute (CFM), preferably in the range of from about 15 to about 25 CFM.

While, as will be apparent to those skilled in the art, the scrim reinforcing strength member may have a wide variety of configurations, preferably it is formed generally in accordance with U.S. Pat. No. 2,902,395 to Hirschy et al. dated September 1959. In this manner, a roll of machine direction threads have applied thereto, normally in an orthogonal direction, a series of cross threads. One or both sets of threads may contain adhesive which bonds the two sets at crossover points. Thus, all threads going in one direction are on one side of the set while all threads going in the other direction are on the other side. In accordance with the present invention and to provide the desired clothlike appearance and tactile properties, the scrim will have about 9 to 14 threads per inch in one direction and about 4 to 6 threads per inch in the other direction, preferably about 12 and about 5, respectively. This provides adhesive-free window areas between the threads which remain soft and bulky.

The selection of a particular adhesive for the scrim is important to achieve the results of the present invention. In general, while a number of adhesives may be utilized, the adhesive must adhere to the particular scrim material and provide bonding of desired strength. In addition, it must be heat reactive and, preferably, bond at a low temperature, for example, below about 275° F. An example of such an adhesive is a polyvinyl chloride resin with a high acetate content such as Oxy 6338 from Oxidental Chemical. In order to achieve the desired low temperature bonding capability, this adhesive is formulated using a blended plasticizer loading of about 60 to 90 parts per hundred resin (phr), and, preferably about 70 to 85 phr. The blended plasticizer system being a combination of 70% by weight Santacizer 148, available from Monsanto blended with 30% by weight of chlorinated wax. This permits bonding with fibers of polypropylene and other component layers, which is generally achieved at temperatures of 275° F. or below. When the (third) component layer is composed of polyester or other fibers, restrictions on the bonding temperatures will be somewhat relaxed and other more common adhesives will be useful.

The third component layer in accordance with the invention comprises a microfiber layer having a basis weight generally of from about 0.4 oz/yd$^2$ (13.6 g/m$^2$) to about 0.75 oz/yd$^2$ (25.4 g/m$^2$) and preferably about 0.5 oz/yd$^2$ (16.95 g/m$^2$) to about 0.65 oz/yd (22.0 g/m$^2$). In order to achieve the desired tactile properties and clothlike appearance, the microfiber layer is preferably meltblown and unbonded or only lightly compacted prior to combining with the scrim and tissue component layers. The microfibers may be selected from those manufactured of synthetic thermoplastic fibers. Preferably, the microfibers are meltblown in accordance with the process described in the Naval Research Laboratory Report 5265 by Lawrence and Lucas entitled "An Improved Device for the Formation of Superfine, Thermoplastic Fibers" and improvements thereto as described, for example, in U.S. Pat. No. 3,978,185 to Buntin, Keller, and Harding dated Aug. 31, 1976 and U.S. Pat. No. 3,959,421 to Weber and Peterson dated May 25, 1976, for example. Thus, a melt is formed of the thermoplastic polymer and extruded into filament forming streams which are contacted by air jets causing the filaments to be drawn and microfibers formed. Such fibers, preferably have an average diameter in the range of up to about 10 microns to achieve desired barrier properties. The meltblown microfiber web, generally, is only lightly compressed or unbonded prior to combining in the laminate of the invention. It is also important that the microfiber web be compatible with and bonded by the adhesive selected for the scrim.

Turning to FIG. 1, one process for forming the laminate of the present invention will be described. Scrim 12 from base roll 15 may be provided with applied adhesive or may have adhesive applied by means of applicator roll 11. As illustrated, two plies of tissue sheet 13 is unwound from roll 10 and combined with scrim layer 12 and meltblown microfiber web 23 from roll 22 at nip 14 between rolls 16 and 18. This combination is then directed over roll 20 to bonding rolls 25 and 26 which are maintained at the desired temperature to activate the adhesive previously applied to the scrim. If desired, the combination may be then directed to a compacting device 28 for further treatment to soften the laminate 34. The treatment composition may be designed to produce alcohol and/or water repellency, fire retardency or the like. Preferably the treatment composition includes glycerine as a softening agent in an amount to result in about 3.5 to 5.5% by weight of glycerine on the resulting laminate 34. After compaction, the laminate 34 may be stored on rolls or directed for conversion or other processing.

For other desired properties such as further enhanced water repellency, alcohol repellency, or fire retardency, the laminate of the invention may be treated at treater 27 in accordance with conventional treatments for such properties. Examples of such treatments will be apparent to those skilled in this art and are described, for example, in U.S. Pat. No. 3,837,996 to Braun and Knauer dated Sept. 24, 1974 and U.S. Pat. No. 3,655,422 to Goldbeck and VanDenElzen dated Apr. 11, 1972.

Compaction device 28 may be selected from a number of such apparatus known and used for the purposes of softening nonwoven webs. Examples include confinement between a rubber belt and a roll or other surface as described in U.S. Pat. No. 2,624,245 to Cluett dated Jan. 6, 1953, sometimes called "Clupaking". Other examples include button breaking rolls, and creping. While the degree of compaction will vary depending upon the desired properties, preferably, webs of the invention will be compacted to the extent that total web length is reduced by up to about 5 percent, more preferably in the range of about 2½ to 3 percent.

Figure 2:
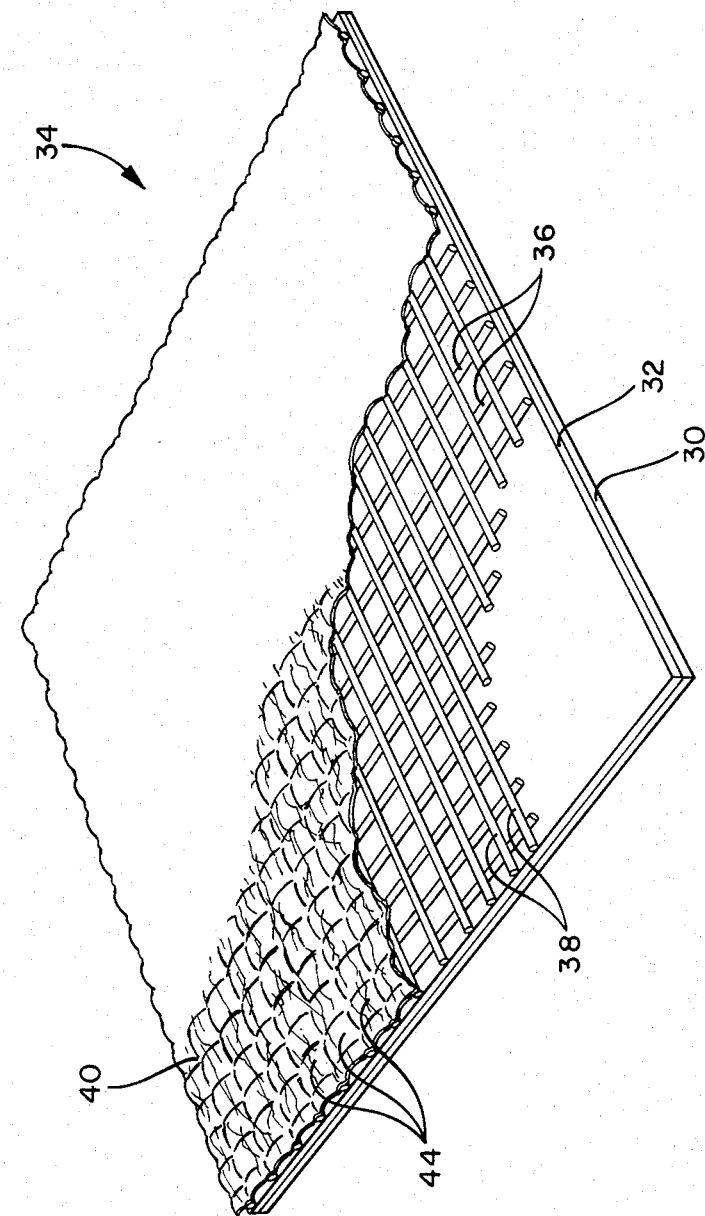
FIG. 2 illustrates in perspective view, partially broken away, an improved nonwoven fabric in accordance with the present invention.

Turning to FIG. 2, the resulting laminate 34 will be further described. As shown in partially broken away form, the laminate comprises two tissue plies 30 and 32 bonded to a scrim composed of filaments 36 in the machine direction and cross-directed filaments 38. Also bonded to the scrim layer is meltblown microfiber layer 40. As shown, the window areas 44 between the scrim filaments remain bulky and unbonded providing a soft, clothlike appearance and feel.

EXAMPLE

The invention will now be further illustrated by means of a specific example.

Example

In accordance with the invention a laminate as shown in FIG. 2 was formed using apparatus as illustrated in FIG. 1. Thus, one component was a scrim composed of 12 nylon filaments per inch of 30 denier in the machine direction and 5 nylon filaments per inch of 100 denier in the opposite direction bonded at crossover points by a latex adhesive. This scrim was coated with 14.2 gsm of plastisol adhesive and combined with two plies of tissue having a basis weight of 16.8 gsm each on one side and a 21.5 gsm layer of meltblown polypropylene microfibers on the other side. The tissue was made using a furnish of 60% bleached northern Kraft fibers and 40% eucalyptus fibers and had a Frazier porosity of 25 CFM. The meltblown microfiber layer was made using a process generally as described in U.S. Pat. No. 3,978,185 to Buntin, Keller and Harding dated Aug. 13, 1976 without bonding the formed web. The tissue/scrim/meltblown combination was bonded by heat activation of the plastisol adhesive and light calender pressure of less than 150 pli on a heated drum. After bonding, the laminate was further treated for repellency by the application of 1.25 gsm of a fluorocarbon water repellency composition containing conventional amounts of extenders and containing glycerine in an amount of 5% by weight. The laminate was then compacted as described in the above-referenced U.S. Pat. No. 2,624,245 to Cluett dated Jan. 6, 1953 to the extent that a 3.5% length reduction was obtained.

The table below compares test results obtained on the materials of the examples as compared with representative conventional and other materials commercially available.

TABLE

| Property | Example | Spunbond/ Meltblown/ Spunbond | Tissue/ Scrim/ Tissue | Wet-laid | Hydraulically Needled |
|---|---|---|---|---|---|
| Weight gms/m² | 79.0 | 61.0 | 86.5 | 65.1 | 72.5 |
| MD/CD Grab Tensile lbs | 13.5/11 | 11/11 | 14/12 | 20.4/17 | 25/12 |
| Porosity (CFM) | 13 | 22 | 15 | 57 | 69 |
| Repellency Mason Jar (minutes) | 60+ | 60+ | 60+ | 60+ | 60+ |
| Impact Resistance (gms) | 0.5 gms | 2.5 gms | 1.0 gms | 13 gm+ | 8 gm+ |
| Repellent to % ispropanol | 70+ | 60+ | 80+ | 70+ | 70+ |
| BFE Dry | 98.7% | 95.7% | 94.3% | 39.8% | 53.3% |
| (Bacterial Filtration Efficiency) | | | | | |

Thus, as shown, the nonwoven laminate webs of the present invention demonstrate improved barrier properties and dry bacteria filtration efficiencies when compared with conventional materials and, at the same time, present excellent strength and tactile properties for an overall very clothlike appearance, feel, and performance. Particularly suited for medical disposable applications, the nonwovens of the present invention may be formed into surgeon's garments, surgical drapes, table covers, and the like. Other uses will be apparent to those skilled in the art.

Thus it is apparent that there has been provided, in accordance with the invention, an improved nonwoven laminate web that fully satisfies the objects, aims, and advantages set forth above. While the invention has been described in conjunction with specific embodiments thereof, it is evident that many alternatives, modification, and variations will be apparent to those skilled in the art in light of the foregoing description. Accordingly, it is intended to embrace all such alternatives, modifications and variations as fall within the spirit and broad scope of the appended claims.

We claim:

1. An improved nonwoven fabric laminate comprising, in combination:
   (a) a tissue layer having a basis weight in the range of from about 30 to 37 gsm including at least one tissue ply and said layer having a Frazier porosity in the range of from about 12 to about 30 CFM;
   (b) a primary strength bearing layer comprising a scrim including crossed filaments having applied thereto a heat reactable plastisol adhesive; and
   (c) a layer of microfibers having an average diameter of less than about 10 microns and a basis weight in the range generally from about 13.6 g/m² to 25.4 g/m²;
   said combination including the scrim layer between the tissue and the microfiber layers and being bonded by means of said heat reactable plastisol adhesive applied to the scrim so that windows of substantially unbonded fibers are formed between the scrim filaments.

2. The nonwoven fabric laminate of claim 1 wherein said heat reactive plastisol adhesive is a highly plasticized polyvinyl chloride with a high acetate content.

3. The nonwoven fabric laminate of claim 1 wherein the microfiber layer comprises meltblown polypropylene.

4. The nonwoven fabric laminate of claim 1 wherein said tissue sheet comprises two plies of unrefined or lightly refined wood pulp fibers.

5. The nonwoven fabric laminate of claims 1, 2, 3, or 4 further containing a treatment for water or alcohol repellency.

6. The nonwoven fabric laminate of claims 1, 2, 3 or 4 further containing 3.5 to 5.5% by weight of glycerine.

7. A method of forming a nonwoven fabric laminate comprising the steps of, (a) providing a tissue layer having a basis weight in the range of from about 30 gsm to about 37 gsm including at least one tissue ply, said layer having a Frazier porosity in the range of from about 12 to about 30 CFM;

(b) providing a primary strength bearing layer comprising a scrim including crossed filaments having applied thereto a heat reactable plastisol adhesive;

(c) providing a layer of substantially unbonded, microfibers having an average diameter of less than about 10 microns and a basis weight in the range generally of from about 13 gsm to about 26 gsm;

(d) positioning said scrim between said tissue layer and said microfiber layer; and (e) activating said plastisol adhesive to interbond said layers while retaining said microfibers in a substantially unbonded condition between said crossed filaments.

8. The method of claim 7 further including the step of treating said interbonded layers for increased water or alcohol repellency.

9. The method of claim 7 further including the step of compacting said interbonded layers.

10. The method of claims, 7, 8 or 9 wherein the microfibers comprise polypropylene.

11. The method of claim 10 wherein the plastisol adhesive is a highly plasticized polyvinyl chloride with a high acetate content.

12. The method of claim 11 wherein said laminate is further treated with glycerine to result in addition of glycerine in the range of from about 3.5 to 5.5% by weight.

* * * * *

UNITED STATES PATENT AND TRADEMARK OFFICE
CERTIFICATE OF CORRECTION

PATENT NO. : 4,522,863

DATED : 11 June 1985

INVENTOR(S) : Keck/Braun/Majors

It is certified that error appears in the above-identified patent and that said Letters Patent are hereby corrected as shown below:

In the title page, item "[21]", for "Appl. No.: 105,273" read --Appl. No.: 622,909--.

Signed and Sealed this

Twenty-sixth Day of August 1986

[SEAL]

Attest:

Attesting Officer

DONALD J. QUIGG

Commissioner of Patents and Trademarks